(No Model.)  2 Sheets—Sheet 1.
H. A. CHASE.
UNDERGROUND TELEGRAPH.
No. 247,166.  Patented Sept. 20, 1881.
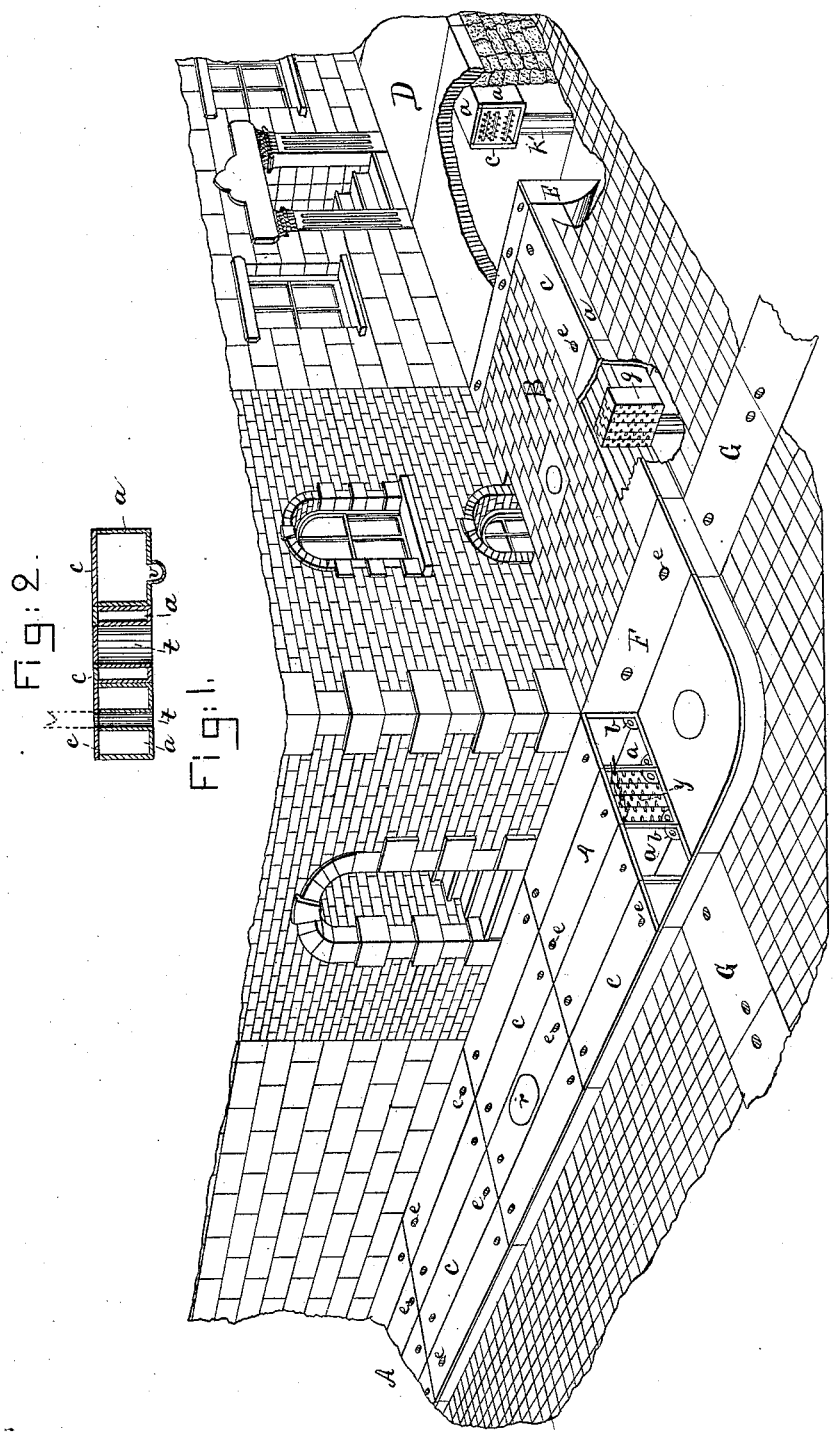
WITNESSES
Arthur Reynolds.
Bernice J. Noyes.
INVENTOR
Henry A. Chase,
by Crosby & Gregory Attys.

(No Model.)  2 Sheets—Sheet 2.
H. A. CHASE.
UNDERGROUND TELEGRAPH.
No. 247,166. Patented Sept. 20, 1881.
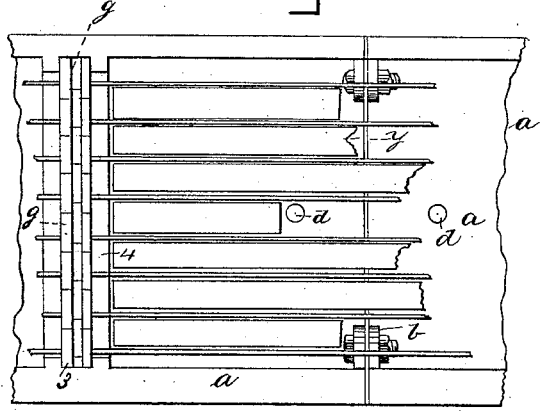
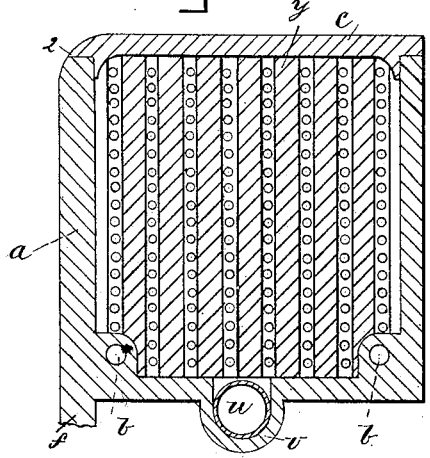
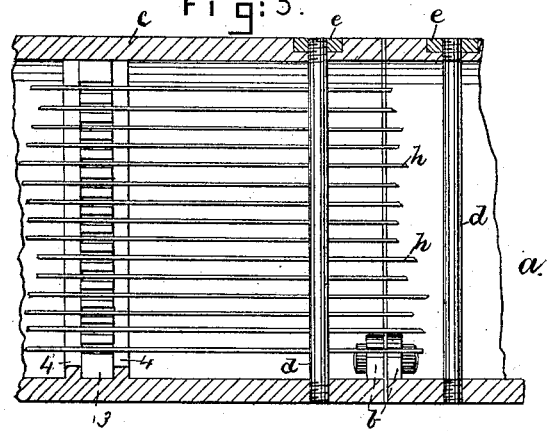
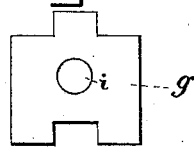
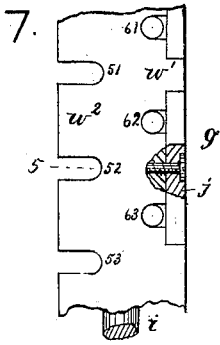
WITNESSES
Arthur Reynolds.
Bernice J. Noyes.
INVENTOR
Henry A. Chase,
by Crosby & Gregory
Atty.

UNITED STATES PATENT OFFICE.

HENRY A. CHASE, OF LYNN, MASSACHUSETTS.

UNDERGROUND TELEGRAPH.

SPECIFICATION forming part of Letters Patent No. 247,166, dated September 20, 1881.

Application filed April 27, 1881. (No model.)

*To all whom it may concern:*

Be it known that I, HENRY A. CHASE, of Lynn, county of Essex, State of Massachusetts, have invented an Improvement in Underground Telegraphs, of which the following description, in connection with the accompanying drawings, is a specification.

My invention relates to underground telegraph-wires, and has for its object to provide a simple and efficient conduit to receive and protect the wires, in which they can be readily reached, when necessary, for the purpose of making repairs, adding new wires, and so on.

My invention is especially applicable to lines passing through cities or regions laid out in streets and covered with buildings.

Underground wires have commonly been placed in pipes buried some distance beneath the surface of the ground, thus necessitating, when the said lines pass through cities, the breaking up of pavements and obstructing the streets while the said pipes are being laid, or subsequently when repairs or renewals are necessary.

These and similar objections I propose to obviate by my invention, which consists in laying the wire-receiving cases or conduits in the sidewalks of cities and providing them with removable covers, which serve to form the surface or flagging of the sidewalk. The said cases are trough-shaped and joined together end to end, as by bolts, suitable packing or gaskets being interposed between the sections to secure tight joints, and these troughs are preferably made of such a width that several of them may be placed side by side in a sidewalk of ordinary width, forming several sections of wire-conduits, so that one of them may be opened to obtain access to the wires therein without disturbing the others, and consequently the sidewalks need never be wholly obstructed at any one time, and no digging or disturbance and removal of earth is necessary.

Suitable pipes may be run longitudinally through one or more of these sections for the purpose of heating and drying their contents, and also for removing the snow from the sidewalk or tops of the covers in winter. These troughs or sections are shown as provided with suitable carriers to sustain the wires and keep them at uniform distance from one another, each of the said carriers being arranged to receive a vertical row of wires, and being arranged to slide vertically out from between the adjacent carriers, to enable the wires carried by it to be reached or removed without disturbing the others. Suitable screens or partitions may be inserted between the different rows of wires to prevent electrical disturbances from passing from one to the other, and also to keep them properly separated and disentangled. When the number of wires passing in a given direction or along a given street is small but one section will be used, this preferably being placed at the outer edge of the sidewalk and forming a curbing therefor, and afterward, if the number of wires becomes greater than can be accommodated by this section, a second section is laid inside of it, and subsequently a third, and so on until the whole sidewalk-space is occupied.

In the construction of some buildings the material is excavated from the space beneath the sidewalk, the said space being connected with the cellar or basement of the building, and usually covered by large blocks of stone, which form the sidewalk and curbing. Where this construction has been adopted I do not propose to move the said stone blocks and replace them by my conduits, as I do when the material is left beneath the sidewalk; but I provide similar conduits properly supported within the said space beneath the said stones, the said conduits being, as before, provided with movable covers, which will be, in this instance, accessible from the basement of the buildings.

Figure 1 is a perspective view of a portion of a street, sidewalk, and buildings illustrating my invention; Fig. 2, a transverse section, showing the arrangement adopted to provide for coal-holes, lamp-posts, &c., passing through the sidewalk; Fig. 3, a top view of a portion of one of the conduits with the covers removed; Fig. 4, a transverse section thereof with the covers in place; Fig. 5, a longitudinal section thereof; Figs. 6 and 7, a top view and side elevation of a portion of one of the removable wire-carriers enlarged.

The sidewalk A, Fig. 1, is shown as entirely composed of my improved telegraph-wire conduits, each of which consists of a series of trough-like boxes, a, which are shown as of cast-iron, the bottom and sides being a single casting provided with suitable lugs, b, to enable them to be fastened together end to end, to form a single continuous conduit, suitable packing being interposed between the ends to insure tight joints, it being of flexible or yielding material to allow for expansion and contraction. These troughs or boxes a are provided with covers c, properly fitted thereto, and secured in place by bolts d, (see Fig. 5,) which may be screwed into the bottoms of the said troughs, and provided at their upper ends with nuts e, to engage and hold the covers c, properly recessed or countersunk, as shown in Fig. 5, to allow the said nuts to lie flush with the upper surfaces of the said covers. The outer one of these conduits is intended to replace the curbstone of the sidewalk, and should be rounded at its upper and outer edge, as shown at 2, Fig. 4, and may be provided with a downwardly-extended flange, f, to pass below the paving-stones and help to hold the said conduit securely in place.

The bottom portions, a, of the conduits are provided at suitable points along their length with wire-carriers g, (shown in Figs. 3 and 5 as held in grooves 3, made by or lying between shoulders or ridges 4, cast upon the bottom and side portions of the said conduits,) the said carriers g being of any suitable form to hold the wires properly, and adapted to slide out from the conduit to enable the wires h carried thereby to be lifted from the conduit.

The wires are preferably symmetrically arranged, as shown in Fig. 4, the wire-holding points of the carriers lying in line with one another. A form of carrier which I have found convenient is illustrated in Figs. 3 and 5, and a modification of one of the removable portions thereof in Figs. 6 and 7. In this form the carrier consists of separate pieces, each holding a vertical row of wires, and being tongued and grooved or otherwise matched between the adjacent pieces, so that it can be slipped out independently thereof. The different portions, when matched together, are held together in the groove 3.

If desired, each carrier may be held independently upon a pin or holding-bar, i, fixed upon the conduit similarly to the bolts d. In this construction the groove 3 and tongues and grooves of the different carrier-pieces may be dispensed with. The removable carrier-pieces are provided with notches 5, to receive the wires, which may be held therein by suitable buttons, j, if desired, the said notches being preferably made on both sides, as shown in Fig. 7, so that each removable piece carries two rows of wires.

A number or index may be marked upon the carrier by the side of each wire for the purpose of identification, such indices being shown in Fig. 7.

Carriers of this construction may be employed in connection with any form of supporting frame-work, other than a closed conduit, whenever it is desirable to hold a large number of wires compactly and evenly and readily accessible.

It will be seen that by this form of carrier any given wire can be removed by sliding the corresponding piece up from between the adjacent pieces, and then removing the wire from its notch therein, this operation not materially disturbing the other wires in the same piece, and not moving the wires carried by the other pieces at all.

In the position of the sidewalk shown at B the number of wires to be accommodated is so small that a single section of the conduit is sufficient, it being placed at the edge of the sidewalk as a substitute for the edge stone or curbing removed for that purpose, the remainder of the sidewalk being of usual construction and covered with any ordinary paving flush with the cover c of the conduit.

The portion D of the sidewalk is shown as composed of large blocks of stone, forming the roof or covering of the space below, which communicates with the basement or cellar of the adjacent building. In this case the conduit may be placed beneath the said stone block and supported on suitable pillars, k, the removable cover c being in this instance placed on the side of the conduit facing the basement of the building, and the carriers being removable laterally when the said covering is removed.

Suitable connecting-boxes, E, will be provided to transfer the wires from one portion of the conduit, as at B, to another portion on a different level or line, as shown at D, and at the corners of the streets the conduits will open into large boxes F, by which the wires can be transferred from one line of conduits to another, as from A to B, and they will be led across the streets by similar boxes, G, the covers of which lie flush with the pavement, and replace the usual crossing-flagging, the said covers being suitably shaped to provide for horse-car rails or other exigencies that may occur.

When the whole sidewalk is occupied, as shown at A, and it is necessary to provide for coal-holes r, or for the base portion of lamp-posts, or other similar structures, the base portion a of the conduit is provided with a tubular passage, t, (see Fig. 2,) extending across it, and leaving sufficient space for the wires at either side, the said wires at this point being diverted from their uniform arrangement on the carriers and crowded together, in order to pass through these contracted spaces.

One or more of the sections may be provided with a steam-pipe, u, (see Fig. 4,) running longitudinally therethrough, the conduit being provided, if desired, with a suitable channel or recess, v, to receive it, the purpose of this pipe being to receive steam or hot air, in order to heat and dry the interior of the conduit, or to melt off snow from the cover $c$ thereof in winter.

Suitable screens or portions, $y$, of conducting or insulating material, or both, may be placed between the different vertical rows of wires, as shown in Figs. 3 and 4, in order to prevent them from crossing or interfering with one another or becoming entangled or confused. When several series of conduits are placed side by side, as shown at A, they will be rigidly fastened together from point to point, as by bolts, and the different base portions $a$ and their covers $c$ may be arranged to break joints, in order to strengthen the construction.

Making a series of different conduits enables a uniform construction to be employed for the accommodation of a large or small number of wires, and enables an increased number to be readily provided for at a given point from time to time. Arranging the wires on carriers enables them to be kept separate from one another and the individual wires to be readily identified, so that any given wire can be readily reached and replaced or repaired, when found to be defective, without disturbing the others.

I do not broadly claim a telegraph-conduit with removable covers arranged to form the curbing or replace the edge-stone of the sidewalk.

Fire-alarm telegraph-wires, when laid in my improved conduits, will rarely be damaged so as to cut off communication at the time when it is most important to maintain it, as frequently happens with the construction now in use, and if by chance communication should be broken at any point, the wires would be readily accessible at either side thereof by any one familiar with their arrangement and use.

I claim—

1. The combination, with a conduit for electrical conducting-wires, of wire-carriers at suitable distances apart in the said conduit, each carrier consisting of independent portions, each matched to slide longitudinally with relation to the adjacent portions to enable the wires carried by one portion to be removed without disturbing the other wires, substantially as described.

2. The conduit and carriers therein, consisting of independent portions, each provided with a tongue and groove to enable it to be removed independently of the adjacent portions, and having a series of notches to receive the said wires arranged as described, whereby the wires can be removed from the said notches when one carrier portion is withdrawn from between its neighboring portions, substantially as set forth.

3. The conduit and carrier therein, provided with holding-points in parallel lines to retain the wires in parallel rows, combined with screens or partitions placed between the said rows, whereby they are separated and preserved from entanglement, and the wires of one series protected from electrical disturbance from the others, substantially as described.

4. The conduit for electrical conducting-wires, arranged to form a portion of a sidewalk, as described, and provided with a tubular passage, $t$, therethrough, substantially as and for the purpose described.

5. The herein-described wire-carrier, consisting of a series of independent portions movable longitudinally relative to one another, and provided with wire-receiving notches in its sides, whereby the wire may be removed laterally from its notch when the portion of the carrier containing it is withdrawn longitudinally from between the neighboring portions, substantially as described.

6. The carrier consisting of independently longitudinally movable portions provided with wire-receiving notches and buttons $j$, to retain the wires therein, combined with the supporting pins or bars $i$, to receive the said carrier portions and support each of them independently of the others, substantially as described.

In testimony whereof I have signed my name to this specification in the presence of two subscribing witnesses.

HENRY A. CHASE.

Witnesses:
G. W. GREGORY,
JOS. P. LIVERMORE.